United States Patent
Amimoto et al.

(10) Patent No.: US 7,595,918 B2
(45) Date of Patent: Sep. 29, 2009

(54) TRANSPARENT ORIGINAL READING APPARATUS AND ILLUMINATING APPARATUS FOR READING APPARATUS

(75) Inventors: Mitsuru Amimoto, Ibaraki (JP); Kimihiko Fukawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1049 days.

(21) Appl. No.: 10/646,926

(22) Filed: Aug. 25, 2003

(65) Prior Publication Data

US 2004/0057086 A1 Mar. 25, 2004

(30) Foreign Application Priority Data

Aug. 27, 2002 (JP) ............... 2002-247250
Jun. 4, 2003 (JP) ............... 2003-159406

(51) Int. Cl.
*H04N 1/04* (2006.01)
*H04N 1/48* (2006.01)
*G03B 27/62* (2006.01)
*G03B 15/04* (2006.01)

(52) U.S. Cl. ............ 358/487; 358/474; 358/497; 358/509; 355/75; 399/220; 399/378; 399/379; 399/380

(58) Field of Classification Search ........... 358/487, 358/509; 399/378
See application file for complete search history.

(56) References Cited

U.S. PATENT DOCUMENTS

| | | | | |
|---|---|---|---|---|
| 4,627,704 A | * | 12/1986 | Hamasaki et al. | 399/221 |
| 4,707,615 A | * | 11/1987 | Hosaka | 358/513 |
| 5,105,289 A | * | 4/1992 | Sonehara et al. | 349/180 |
| 5,124,799 A | * | 6/1992 | Tsuboi et al. | 358/296 |
| 5,239,392 A | | 8/1993 | Suzuki et al. | 358/474 |
| 5,923,042 A | * | 7/1999 | Mietta et al. | 250/559.06 |
| 5,933,186 A | * | 8/1999 | Ikari et al. | 348/97 |
| 6,239,421 B1 | * | 5/2001 | Nagata et al. | 250/208.1 |
| 6,335,808 B1 | * | 1/2002 | Yamada et al. | 358/487 |
| 6,502,946 B1 | | 1/2003 | Fujino et al. | 362/31 |
| 6,519,023 B1 | * | 2/2003 | Chang | 355/18 |

(Continued)

FOREIGN PATENT DOCUMENTS

JP 1-284067 11/1989

(Continued)

OTHER PUBLICATIONS

Office Action in Chinese from counterpart application 031558976 in Patent Office in China, dated Jun. 10, 2005.

*Primary Examiner*—Mark K Zimmerman
*Assistant Examiner*—Mesfin Getaneh
(74) *Attorney, Agent, or Firm*—Fitzpatrick, Cella, Harper & Scinto

(57) ABSTRACT

A reading apparatus comprising a plate on which a transparent original is placed, and a guide unit for setting the transparent original at a predetermined position on the original plate. A light source unit is settable at plural positions in contact with the guide unit for illuminating the transparent original which is urged against the original plate by the light source unit. A portion of the light source unit which is contacted with the transparent original is chamfered (R-worked) not to damage the transparent original. Further, a portion of the light source unit which is contacted with the transparent original is designed to urge the transparent original at an out of an image area of the original.

7 Claims, 18 Drawing Sheets

U.S. PATENT DOCUMENTS

| | | | |
|---|---|---|---|
| 6,545,777 B1 | 4/2003 | Amimoto | 358/509 |
| 6,927,879 B2* | 8/2005 | Takahashi | 358/471 |
| 2002/0054385 A1 | 5/2002 | Fukawa | 358/505 |
| 2002/0131094 A1* | 9/2002 | Koshimizu et al. | 358/509 |
| 2003/0043351 A1* | 3/2003 | Ochi et al. | 355/18 |
| 2003/0043410 A1 | 3/2003 | Fukawa et al. | 358/2.1 |
| 2003/0150918 A1* | 8/2003 | Nogami et al. | 235/454 |

FOREIGN PATENT DOCUMENTS

| | | |
|---|---|---|
| JP | 6-111007 | 4/1994 |
| JP | 2001-34210 | 2/2001 |
| JP | 2001-313784 A | 11/2001 |

* cited by examiner

TC = 15.1mm
WAVELENGTH λ = 570nm

TRANSPARENT ORIGINAL READING APPARATUS AND ILLUMINATING APPARATUS FOR READING APPARATUS

BACKGROUND OF THE INVENTION

1. Field of the Invention

The present invention relates to an image reading apparatus and more particularly it relates to an image reading apparatus for reading a transparent original rested on an original glass plate.

2. Related Background Art

In the past, in a case that a transparent original such as a photographic film is read by an image reading apparatus of flat head type having an original glass plate, there has mainly be used a system in which the transparent original is firstly installed in an transparent original guide unit and then the transparent original guide unit is rested on the original glass plate and then the transparent original is illuminated from above by means of a surface light source unit. The image reading apparatus according to this system is generally designed so that a position completely focused becomes a position having a distance of 0 mm from an upper surface of the original glass plate, i.e. a position contacted with the original glass plate. The reason is that it is considered or supposed that a reflection type original is mainly used. In a case that the transparent original is used, generally, the transparent original is installed at a distance of about 0.5 mm above the original glass plate by means of a transparent original guide.

In this system, in a case that the image is picked up on CCD by using a lens of minification optical system, since a depth of field is deep, even if the distance between the original glass plate and the transparent original is about 0.5 mm, there is no practical problem. Further, if the transparent original is curled more or less, there arises no problem.

However, in recent years, there has been proposed a reading unit according to an equal magnification optical system using a rod lens array so as to attain miniaturization. Since the depth of field of the rod lens array is shallow, if the distance between the original glass plate and the transparent original is about 0.5 mm or if the transparent original is curled, there arises a problem regarding out of focus.

SUMMARY OF THE INVENTION

To achieve the above object, the apparatus for reading images according to the present invention is constituted as follows:

That is to say the present invention provides an image reading apparatus comprising an original plate on which a transparent original is installed, a transparent original guide unit for installing the transparent original at a predetermined position on the original plate, a light source unit constituted so that it can be installed at plural positions with respect to the transparent original guide unit and having a surface light source for illuminating the transparent original, and an image reading unit for reading an image of the transparent original through the original plate, wherein the transparent original is installed inside of the transparent original guide unit installed on the original plate and in contact with the original plate and the light source unit is contacted with the transparent original and urges the transparent original against the original plate.

The present invention further provides an image reading apparatus for reading a transparent original in which a transparent original illuminating device, a transparent original, a focusing lens and a reading sensor are arranged in order, wherein the transparent original illuminating device is provided at its transparent original side with a plurality of urging (or pressing) portions disposed at positions corresponding to an out of an image area of the transparent original and protruded above a light generating surface and the transparent original is urged (or pressed) against the transparent original plate by the urging portions.

The present invention further provides a transparent original illuminating apparatus which is to be installed on a transparent original plate together with a transparent original when the transparent original is read by an image reading apparatus in which the transparent original plate, an imaging lens and a reading sensor are arranged in order, wherein the transparent original illuminating apparatus is provided at its transparent original side with a plurality of urging (or pressing) portions disposed at positions corresponding to an out of an image area of the transparent original and protruded above a light generating surface and the transparent original is urged (or pressed) against the transparent original plate by the urging portions.

DESCRIPTION OF THE PREFERRED EMBODIMENTS

Now, preferred embodiments of an image reading apparatus according to the present invention will be explained with reference to the accompanying drawings.

First Embodiment

Figure 1A:
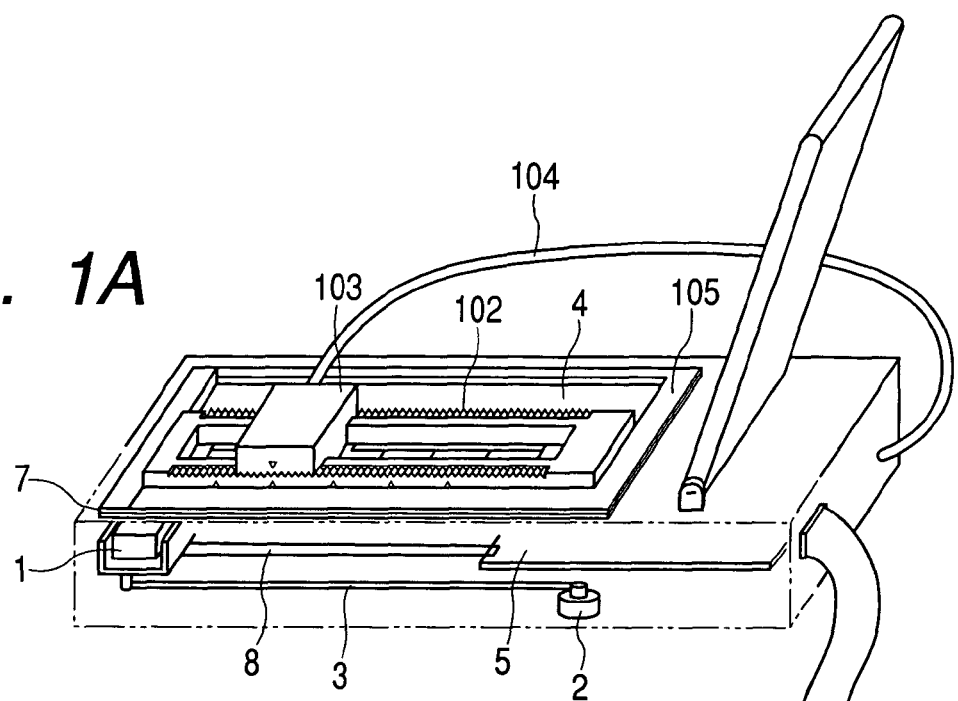
FIGS. 1A, 1B and 1C are, respectively, perspective, front, and plan views showing a fundamental construction of an image reading apparatus according to a first embodiment of the present invention.
Figure 1B:
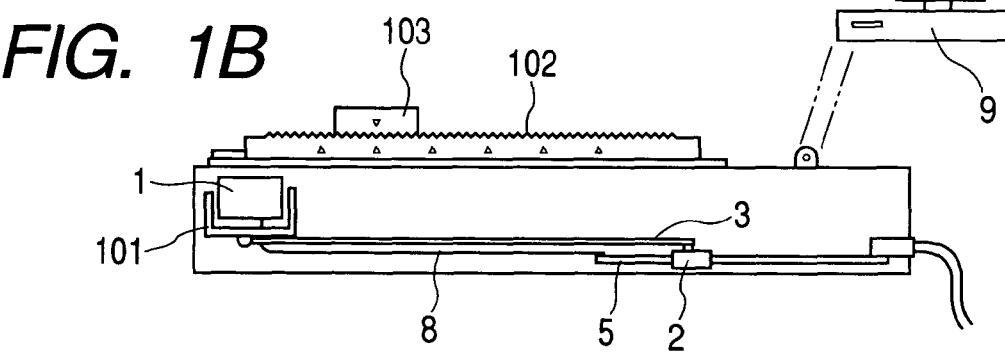
Figure 1C:
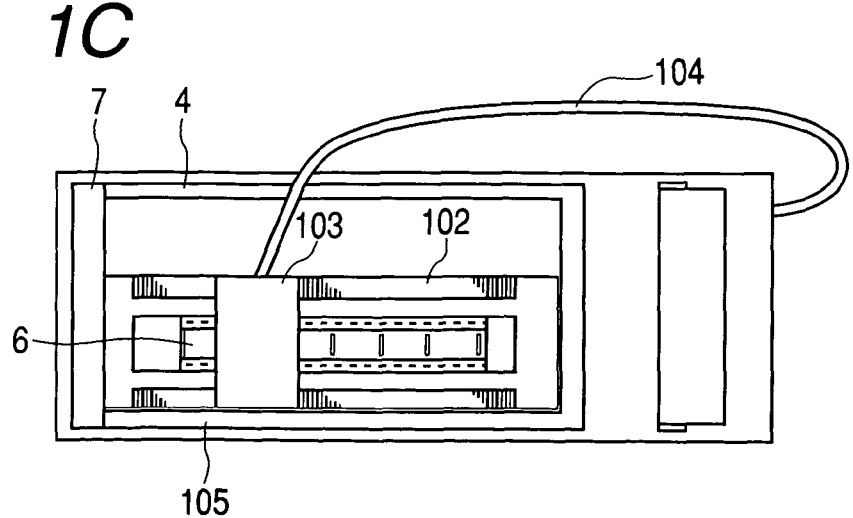

FIGS. 1A to 1C are views showing an image reading apparatus according to a first embodiment of the present invention. In FIGS. 1A to 1C, the image reading apparatus includes a reading unit 1, a stepping motor 2, a belt 3, an original plate 4, a control substrate 5, a 35 mm photo-film 6, a white color reference plate and (concurrently) original regulating plate 7, a flat cable 8, an external computer 9, a holder 101 to which the reading unit 1 is attached, a film guide 102 for fixing the 35 mm photo-film 6, a light source unit 103 for the film, a cable 104 for connecting the light source unit 103 to the control substrate 5, and an original regulating plate 105.

Figure 2:
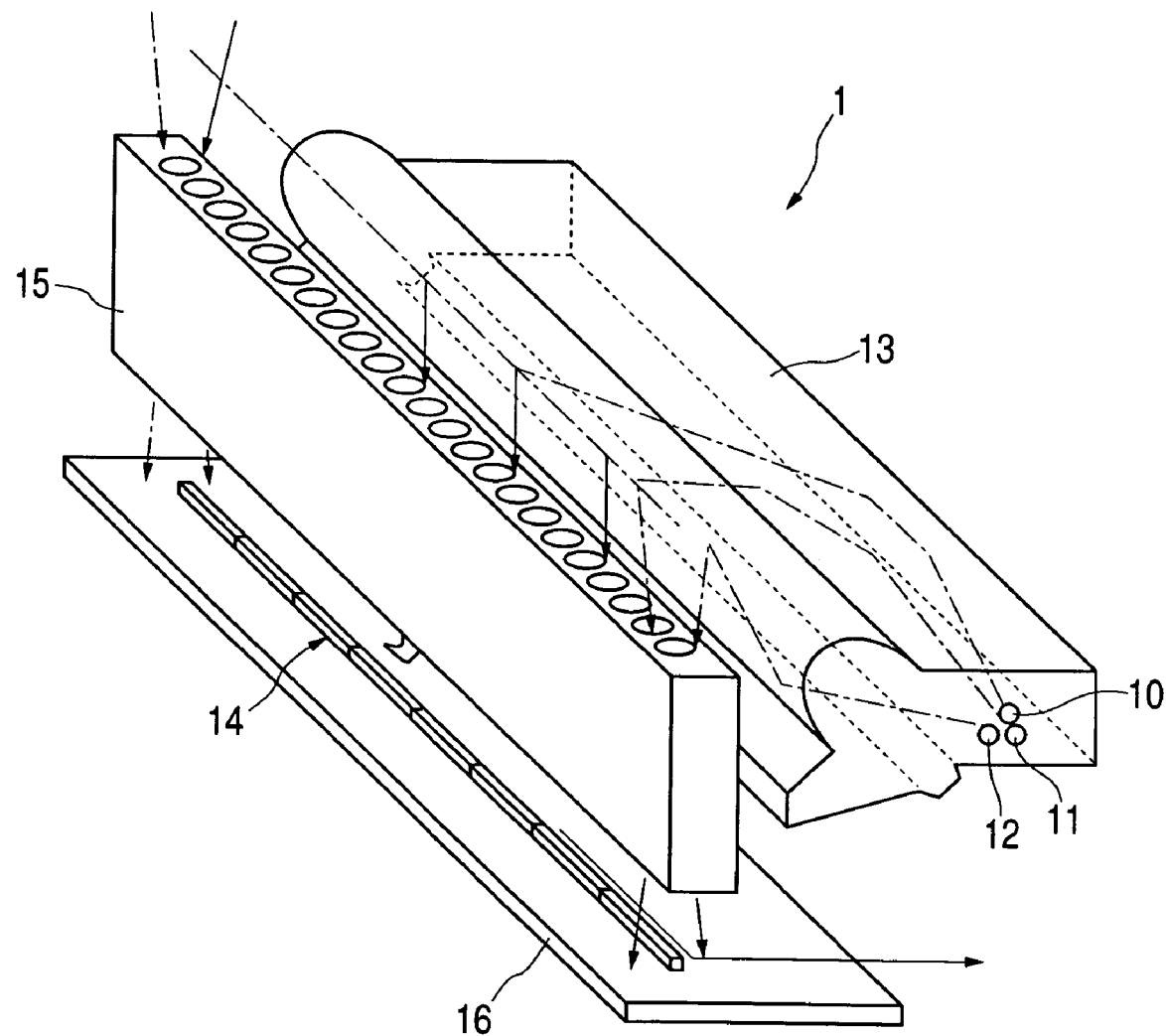
FIG. 2 is a constructional view of a reading unit of the image reading apparatus according to the first embodiment of the present invention.

FIG. 2 is a constructional view of the reading unit 1. This unit includes a red color LED 10, a green color LED 11, a blue color LED 12, a light conductive member 13, photo-electric converting element arrays 14, a rod lens array 15 and a substrate 16 to which the photo-electric converting elements are attached.

Next, an operation of the apparatus will be briefly explained.

The stepping motor 2 is driven by the control substrate 5. A driving force of the motor is transmitted to the holder 101 and accordingly to the reading unit 1 through the belt 3, with the result that the reading unit 1 scans an object to be read rested on the original glass plate 4 while shifting along the original glass plate 4 continuously.

As shown in FIG. 2, the photo-electric converting element arrays 14 attached to the reading unit 1 is arranged along a longitudinal direction of the reading unit 1. In the illustrated embodiment, the reading unit is a reading unit having density corresponding to 2400 DPI in a width-wise direction of an A4 size original and including eight photo-electric converting element arrays 14 arranged in a line. The number of elements in each photo-electric converting element array 14 is 2576 (elements) and, thus, the photo-electric converting element arrays including 20608 elements in total are arranged on the substrate 16.

Here, first of all, a case where the object to be read rested on the original glass plate 4 is a reflection type original (not shown) will be explained.

Lights from the red color LED 10, green color LED 11 and blue color LED 12 reach an upper surface of the glass plate while being dispersed in the longitudinal direction of the reading unit 1 by means of the light conductive member 13.

The lights are diffused and reflected by the reflection type original rested on the upper surface of the glass plate and are collected by the rod lens array 15 to be projected onto the photo-electric converting element arrays 14. The rod lens array 15 projects an image of the reflection type original onto the photo-electric converting element arrays 14 with equal or same magnification. When receiving the lights of the LEDs 10, 11 and 12 reflected by the reflection type original, charges are accumulated in the photo-electric converting elements arrays 14 and are reserved in transfer portions of the photo-electric converting element arrays 14 by a next cycle reading start pulse (Hsync) and are outputted as electric signals for respective pixels by a pixel reading clock (Clock).

Lighting operations of the red color LED 10, green color LED 11 and blue color LED 12 are switched by each reading start pulse (Hsync). As the reading unit 1 is shifted, the LEDs 10, 11 and 12 are successively lighted. Image signals color-decomposed by the LEDs 10, 11 and 12 and detected are sent from the control substrate 5 to the external computer 9 through the flat cable 8 and image processing is performed in the external computer 9.

Figure 3A:
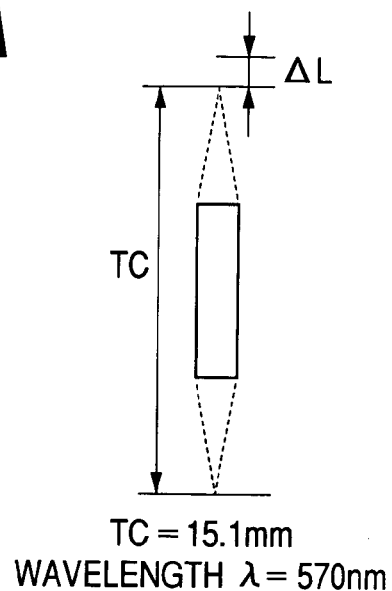
FIGS. 3A, 3B and 3C are views showing property of a rod lens of the reading unit according to the first embodiment of the present invention.
Figure 3B:
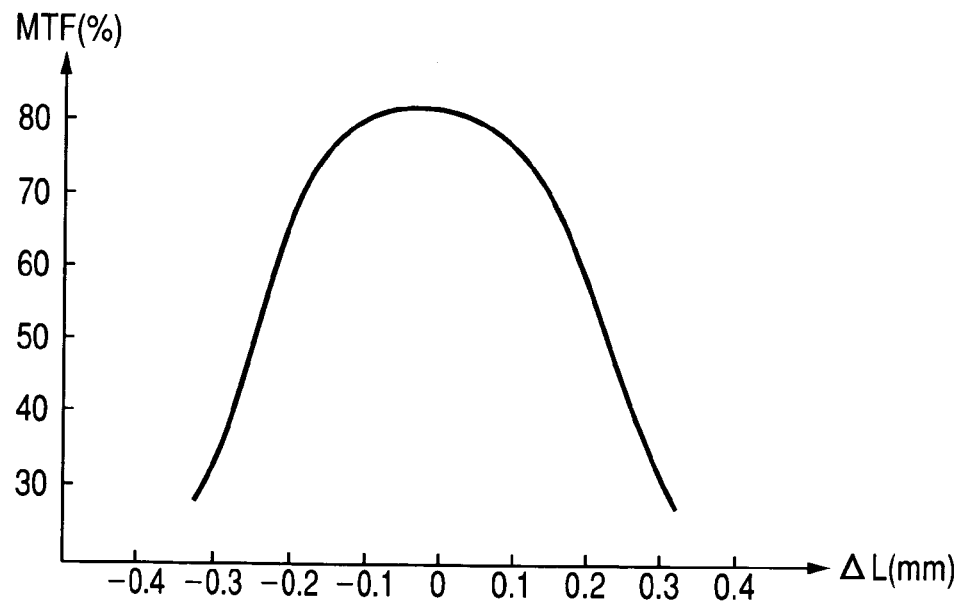
Figure 3C:
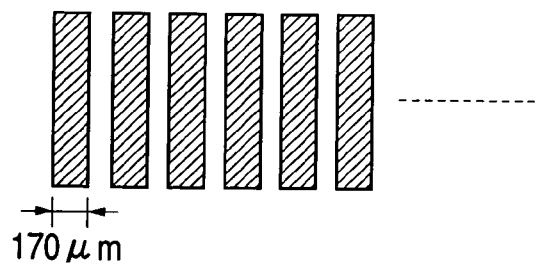

FIGS. 3A to 3C are views showing the depth of field regarding the rod lens array 15. "TC" shown in FIG. 3A indicates a focus position when looking at the rod lens array as a side view. In this example, a wave length $\lambda$ of 570 mm and a TC of 15.1 mm are used. A graph illustrated in FIG. 3B shows change in MTF when spaced apart from the focus position by a distance of $\Delta L$.

Now, MTF is represented by the following equation (1):

$MTF$=(white density minimum value−black density maximum value)/(reference white density value− reference black density value)  (1)

In the illustrated embodiment, the MTF is calculated from (1) an original in which white stripes and black stripes having a width of 170 μm are arranged alternately, and (2) an image obtained by reading such an original. The MTF is calculated on the basis of a white density minimum value of the read image data, and a black density maximum value of the same, and by using density of the original as reference white density and reference black density.

Although the MTF is an index indicating a resolving power, if the distance $\Delta L$ is increased, the image becomes dim and the MTF value is reduced. When the measurement is performed by using the original having the alternately arranged stripes having the width of 170 μm according to the illustrated embodiment, a practical range is a range in which the MTF value is greater than 40%. As can be seen from the graph shown in FIG. 3B, the MTF value becomes maximum (about 82%) when $\Delta L$=0 mm. However, if a position is deviated from that position by about 0.25 mm, the MTF value will become about 40% or less.

The image reading apparatus according to the illustrated embodiment is designed so that $\Delta L$ becomes zero at the upper surface of the original glass plate 4, by supposing that the reflection type original is mainly used. From this fact, it is desirable that, also in case of the transparent original such as a 35 mm photo-film, the original is rested in contact with the original glass plate 4.

Next, the reading of the 35 mm photo-film will be explained.

Figure 4:
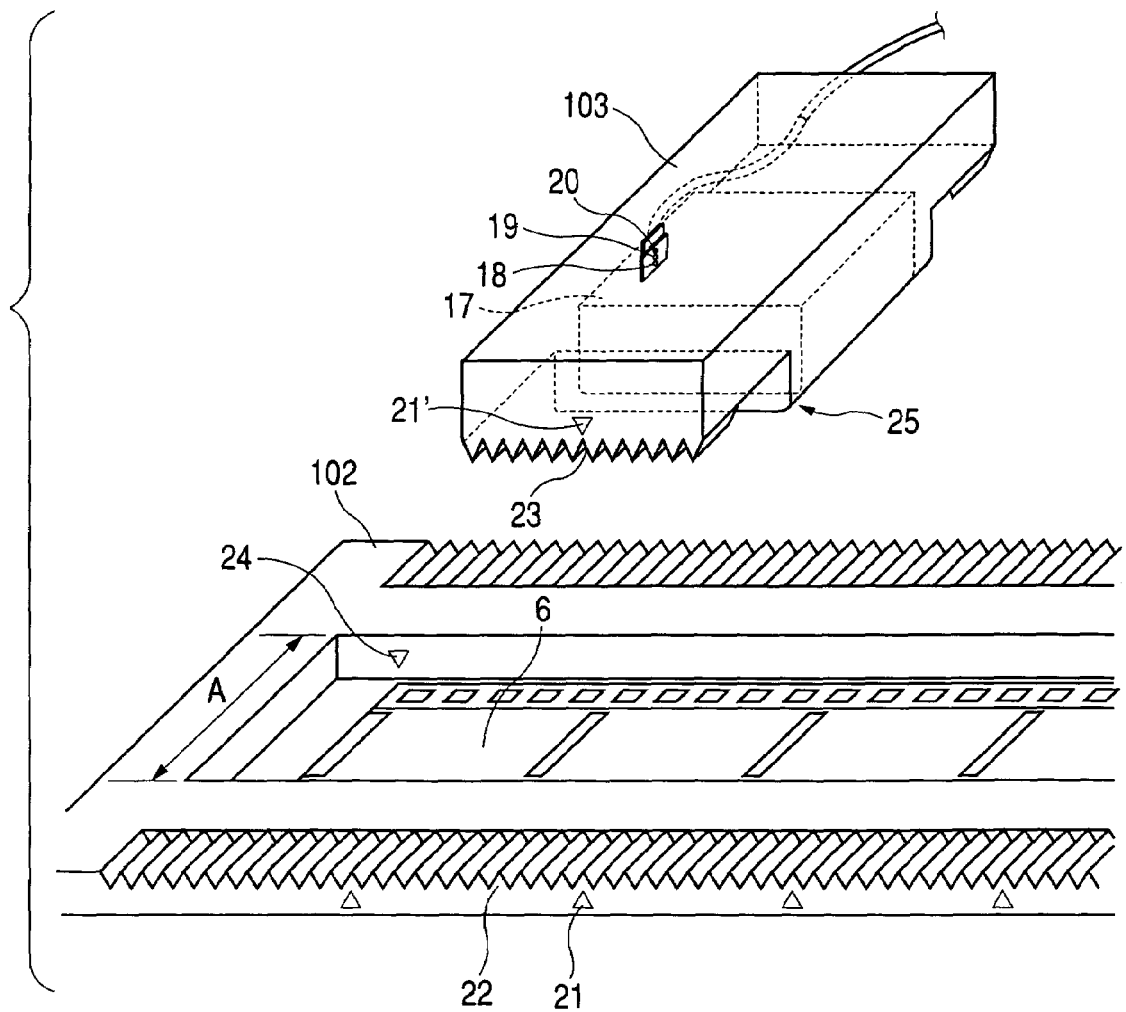
FIG. 4 is a view showing constructions of a film guide and a film light source unit according to the first embodiment of the present invention.
Figure 5:
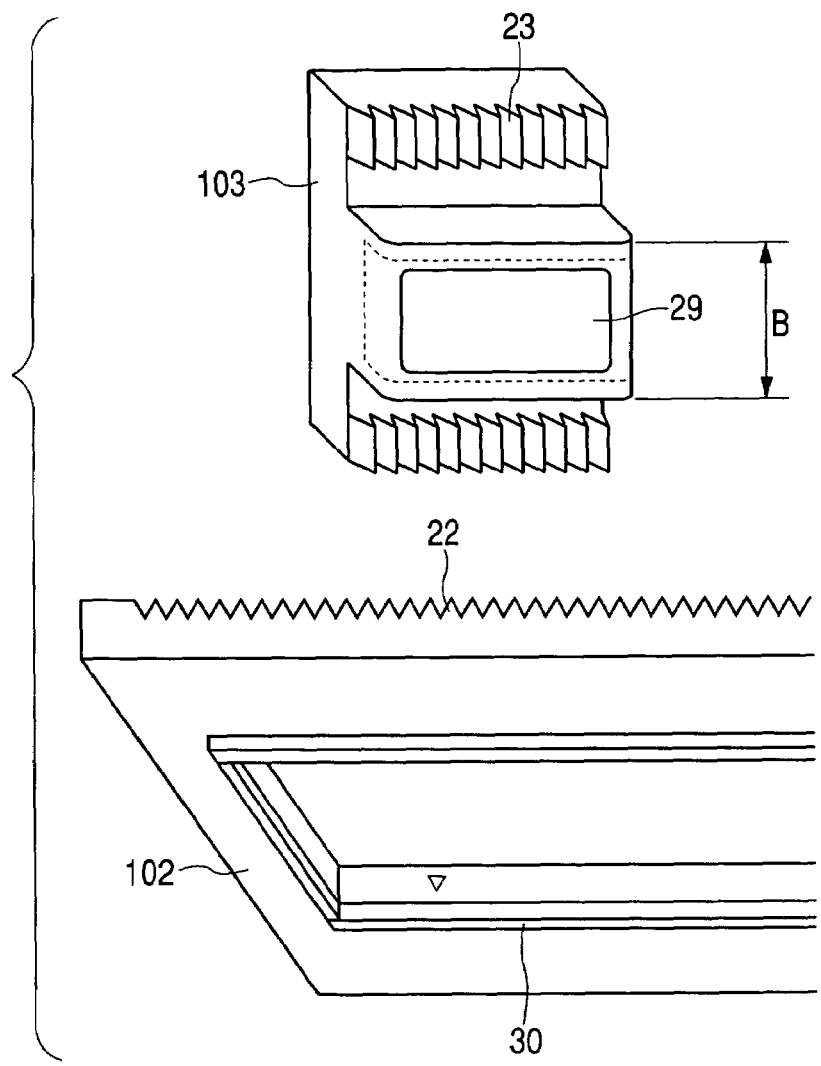
FIG. 5 is a rear view of the film guide and the film light source unit according to the first embodiment of the present invention.
Figure 6:
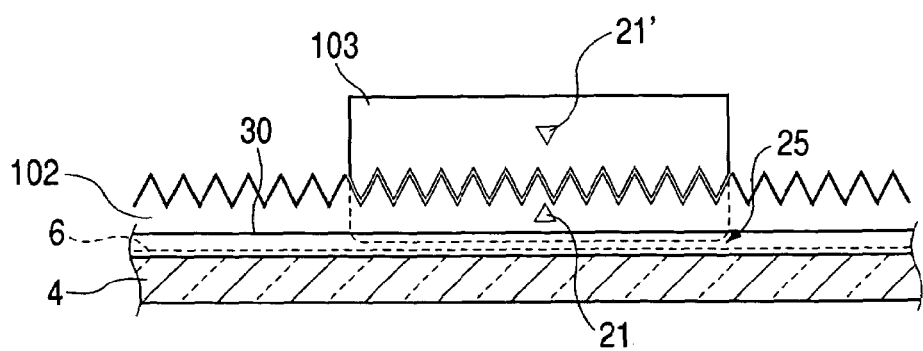
FIG. 6 is a side view showing installation of 35 mm photo-film in a longitudinal direction, according to the first embodiment of the present invention.
Figure 7A:
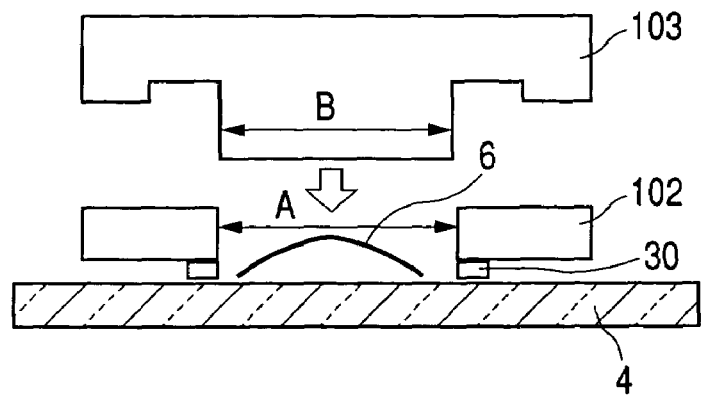
FIGS. 7A and 7B are side views showing installation of 35 mm photo-film in a width-wise direction, according to the first embodiment of the present invention.
Figure 7B:
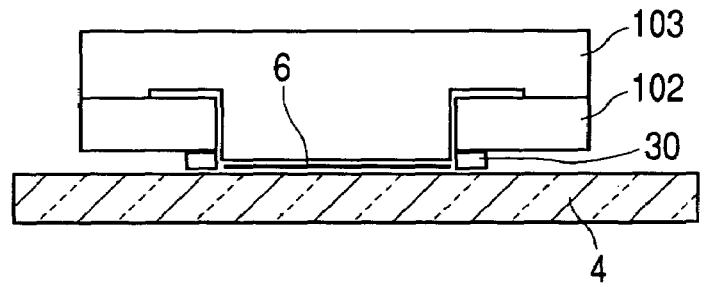

FIG. 4 is a constructional view showing the light source unit 103 for the film, i.e. film light source unit 103 and the film guide 102 used when the 35 mm photo-film is read, and FIG. 5 is a rear view of the film light source unit 103 and the film guide 102, looked at from the original plate side. FIG. 5 shows an effective illumination surface 29 and a rubber material 30. FIG. 6 is a side view looked at from a longitudinal direction, showing an installed condition, and FIGS. 7A and 7B are side views looked at from a width-wise direction, showing a condition that curl of the 35 mm photo-film 6 is corrected during the installation.

The film light source unit 103 includes therein a diffusing plate 17, a red color LED 18 for the film, a green color LED 19 for the film and a blue color LED 20 for the film. As the diffusing plate 17 according to the illustrated embodiment, for example, a face light source disclosed in Japanese Patent Laid-open No. 2001-34210 may be used. Lights from the LED are diffused by the diffusing plate 17 so that uniform light is emitted from a lower surface of the diffusing plate shown. The diffusing plate 17 according to the illustrated embodiment is an area of the effective illumination surface 29 and has a dimension of 50 mm×25 mm which can illuminate an effective image area (about 36 mm×24 mm) corresponding to one frame of the 35 mm photo-film 6.

The film guide 102 is a frame member having a rectangular hole within which the 35 mm photo-film 6 having six continuous frames are arranged, and the film guide is installed on the original glass plate 4. As shown in FIG. 5, the rubber material 30 as an elastic member is stuck on an inner rear surface of the rectangular hole. A function of the rubber material will be explained with reference to FIGS. 7A and 7B and FIG. 8. The 35 mm photo-film 6 is installed in contact with the original glass plate 4 within the rectangular hole of the film guide 102. An inner dimension A of the rectangular hole shown in FIG. 4 is 35 mm which can just house the 35 mm photo-film 6.

The user can manually install the film light source unit 103 at a desired position on the upper surface of the 35 mm film. In this case, the 35 mm photo-film 6 is installed so that an end of the 35 mm photo-film 6 is aligned with an installation reference mark 24 provided within the rectangular hole of the film guide 102. In the installation, by aligning a frame position indicating mark 21' provided on the side surface of the film light source unit 103 with one of frame position indicating marks 21 provided on the side surface of the film guide 102, the effective image area of one frame of the 35 mm photo-film 6 can be illuminated by the face light source of the film light source unit 103. Alternatively, if it is desired that the illuminating area can be adjusted minutely, the light source unit can be installed at any position on the basis of the frame position indicating mark 21.

As shown in the longitudinal side view of FIG. 6, the 35 mm photo-film 6 is pinched between the original glass plate 4 and the film light source unit 103 to be installed in contact with both of these elements. Now, by using the width-wise side views as shown in FIGS. 7A and 7B, a state that the curl of the 35 mm photo-film 6 is corrected will be explained. In FIG. 7A, a dimension B of the film light source unit 103 is slightly smaller than the dimension A of the rectangular hole of the film guide 102 so that the film light source unit 103 can just be housed within the film guide 102.

The curled 35 mm photo-film 6 is rested on the original glass plate 4. When the film light source unit 103 is installed from the above (FIG. 7B), the curl is corrected by a weight of the film light source unit 103 itself.

Figure 8:
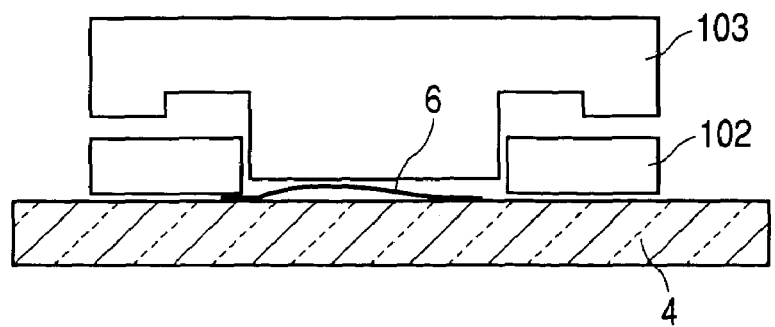
FIG. 8 is a view for explaining a function of an elastic member according to the first embodiment of the present invention.

By the way, the rubber material 30 serves to eliminate a gap between the original glass plate 4 and the film guide 102 by utilizing its soft property and to prevent the 35 mm photo-film 6 from entering below the film guide 102. Further, since a coefficient of friction of the rubber material is great, the function for preventing the 35 mm photo-film 6 from entering is enhanced. If there is no rubber material 30, as shown in FIG. 8, the 35 mm photo-film 6 is apt to enter below the film guide 102. Incidentally, in FIGS. 7A and 7B, while an example that the 35 mm photo-film 6 is corrected in the width-wise direction is illustrated, the correction in the longitudinal direction can similarly be performed.

Figure 9:
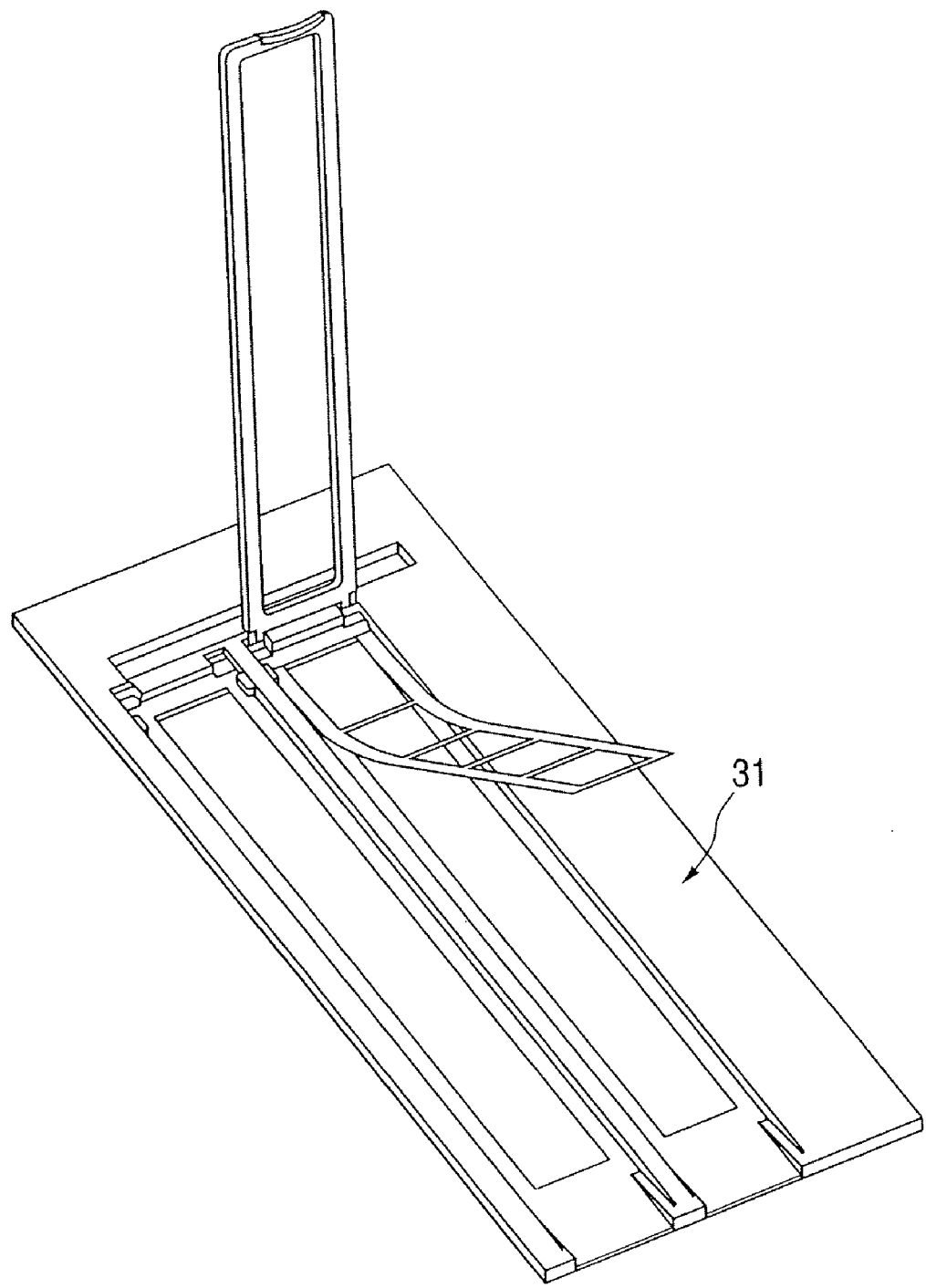
FIG. 9 is a view showing a conventional film guide.
Figure 10:
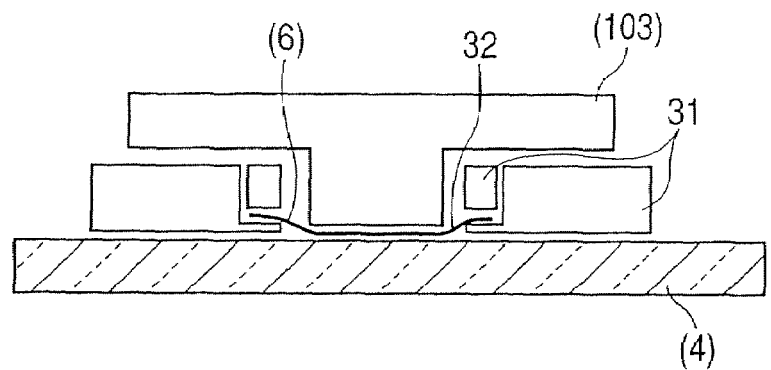
FIG. 10 is a side view showing installation of 35 mm photo-film using the conventional film guide.

FIG. 9 shows a conventional film guide. As shown in FIG. 9, the conventional film guide 31 is of type in which 35 mm photo-film is pinched. As can be seen in a side view of FIG. 10, ends of the 35 mm photo-film (6) ride on the conventional film guide (31), with the result that, even when the 35 mm photo-film is pressed by a film light source unit (103) from the above, the photo-film cannot be rested on an original glass plate (4) completely. In this condition, at a position 32, since the photo-film is slightly floating above the original glass plate (4), it is apt to occur out of focus at this position.

In order to eliminate the floating of the photo-film from the original glass plate 4, in the illustrated embodiment, as can well be seen from FIG. 4 or FIGS. 7A and 7B, the 35 mm photo-film 6 is not attached to the film guide 102 but merely rested on the original glass plate 4.

A point 25 shown in FIGS. 4 and 6 indicates R-working. A side of the film light source unit 103 with which the 35 mm photo-film 6 is contacted is formed with R-working as shown by the point 25. The reason is that damage of the 35 mm photo-film 6 is prevented upon contact. A side opposite to the point 25 is also formed with R-working. In the illustrated embodiment, although the R-working is applied to only two width-wise sides, such R-working can be applied to all of four sides.

If there is no R-working, load is concentrated at corners of the sides of the film light source unit 103 with which the 35 mm photo-film 6 is contacted, with the result that the 35 mm photo-film is apt to be damaged. In this example, R=0.6 mm. Regarding this, for the reasons that the weight of the face light source unit is small (about 150 grams) and that the face light source unit is not moved so much during the operation, even small R such as 0.6 mm can provide an adequate effect.

As can be seen from FIGS. 4 and 6, in constructions of the film light source unit 103 and the film guide 102, triangular indentations 23 on the lower surface of the film light source unit 103 are engaged by triangular indentations 22 on the upper surface of the film guide 102 to prevent lateral sliding. The reason is that, upon installation of the film light source unit 103, the film light source unit is prevented from being slid inadvertently while contacting with the 35 mm photo-film 6. Further, the reason is that, also after the installation, the lateral sliding due to inadvertent touching by the operator is prevented to prevent scratching of the 35 mm photo-film due to inadvertent lateral sliding and to prevent deviation of the illuminating position.

However, if the indentations 22 and 23 are engaged by each other completely, loading of the film light source unit 103 upon the 35 mm photo-film 6 will become inadequate. In this case, since it is difficult to correct the curl of the 35 mm photo-film 6, a height of the film light source unit 103 is selected so that slight gaps are generated in the engaged portions.

In the above-mentioned construction, the 35 mm photo-film 6 is installed and the image reading apparatus shown in FIG. 1 performs a reading operation for the 35 mm photo-film 6.

Lights emitted from the LEDs of the film light source unit 103 pass through the 35 mm film and are projected on the photo-electric converting element arrays 14 by the rod lens array 15. Similar to the reading of the above-mentioned reflection type original, as the reading unit 1 is shifted, the film LEDs 18, 19 and 20 are lighted successively. On the other hand, the film light source unit 103 is not shifted, but, only the reading unit 1 is shifted to scan the 35 mm photo-film 6.

Second Embodiment

Next, a second embodiment of the present invention will be explained.

Figure 11:
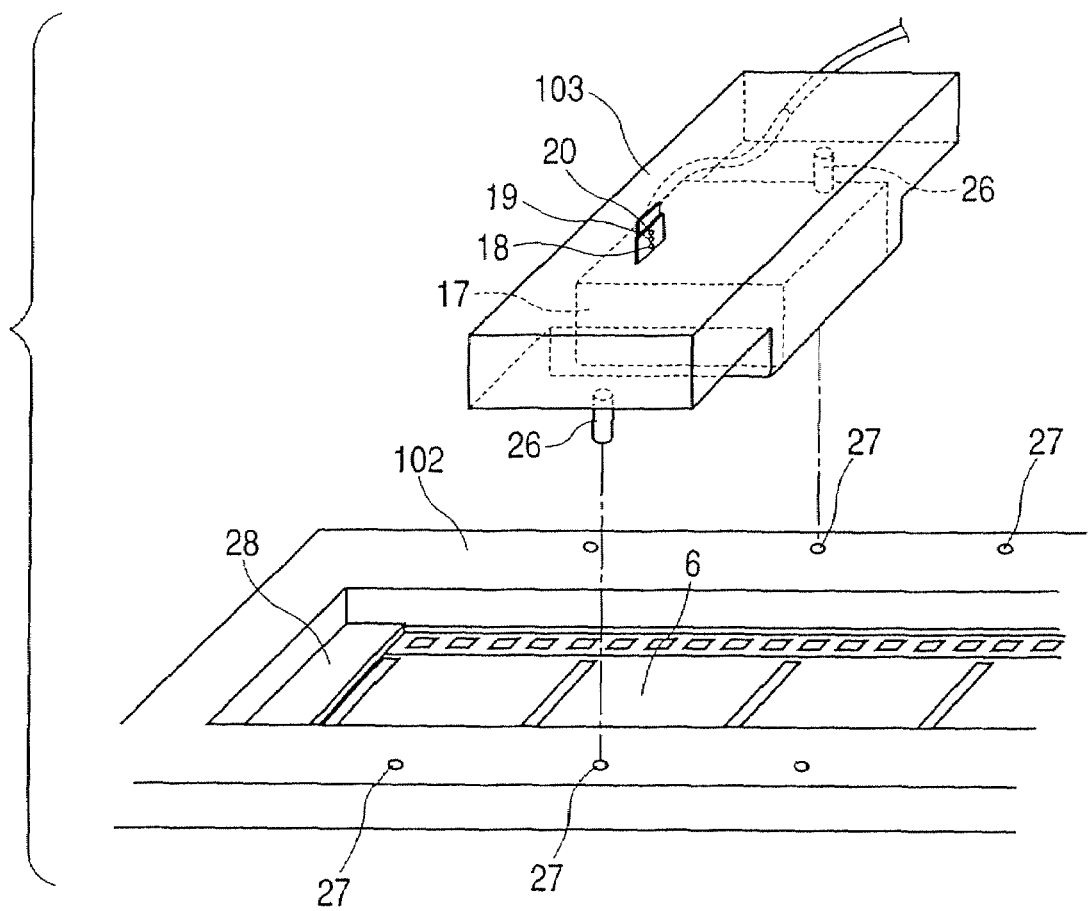
FIG. 11 is a view showing construction of a film guide and a film light source unit according to a second embodiment of the present invention.

FIG. 11 shows a constructional example of a film light source unit 103 and a film guide 102 according to a second embodiment of the present invention. The film light source unit 103 is provided with positioning projections 26 and the film guide 102 is provided with positioning recesses 27, and these positioning projections and recesses are arranged at an interval corresponding to one frame of the 35 mm photo-film 6.

In the second embodiment, in a case that the 35 mm photo-film is read, the 35 mm photo-film 6 is installed so that an end of the 35 mm photo-film abuts against a film installation regulating plate 28. By selecting a desired combination of the positioning projection 26 and the positioning recess 27 corresponding to a desired frame, the film light source unit 103 can be installed on the desired frame.

Third Embodiment

Next, a third embodiment of the present invention will be explained.

Figure 12:
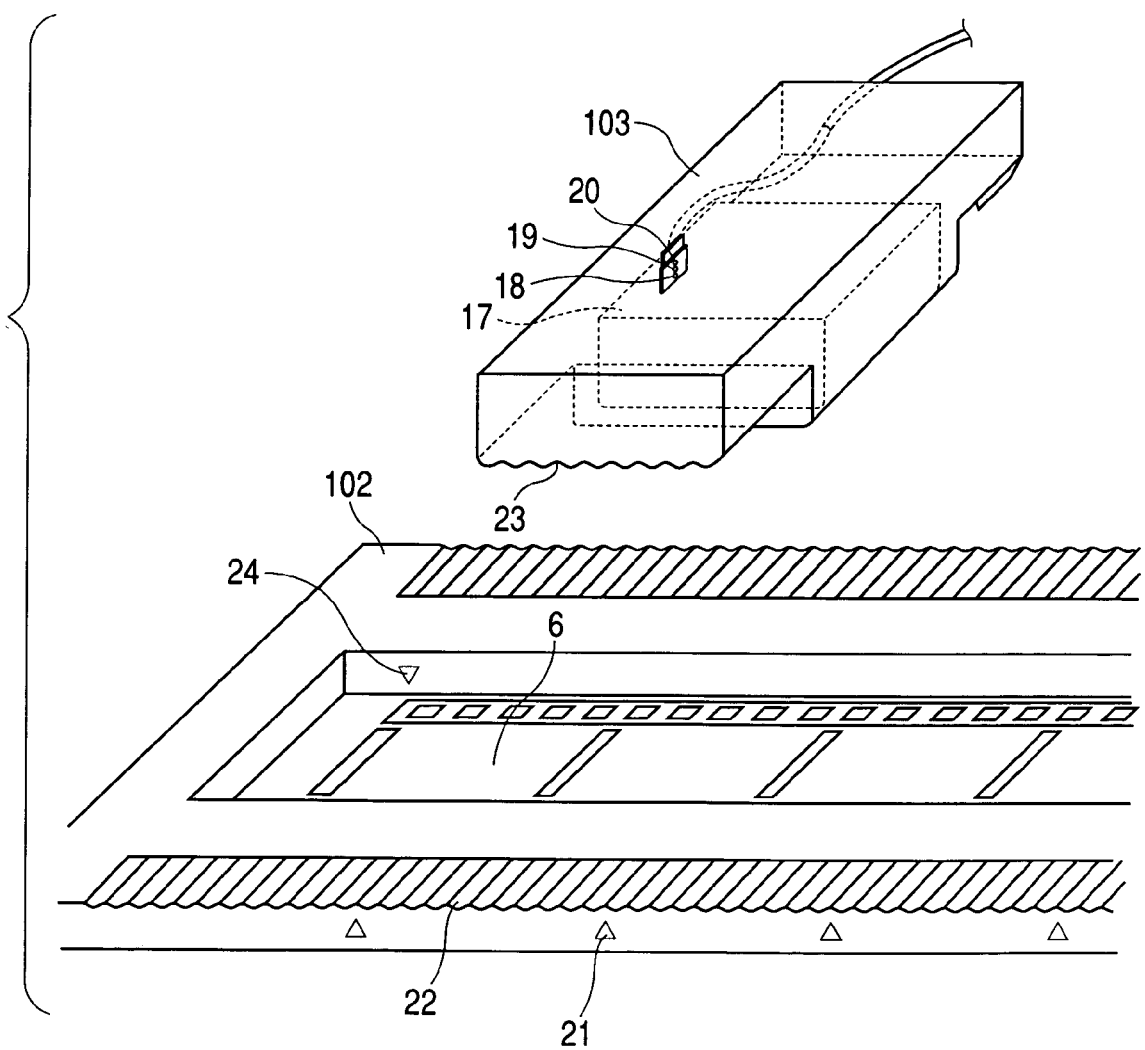
FIG. 12 is a view showing construction of a film guide and a film light source unit according to a third embodiment of the present invention.

In a third embodiment of the present invention, as shown in FIG. 12, in place of the triangular indentations 22 and 23 according to the first embodiment shown in FIG. 4, wave-shaped indentations are used. In this case, similar shaped indentations can be used, and, in place of continuous indentations, non-continuous indentations can be used, so that, by forming a plurality of triangular, wave-shaped or similar shaped indentations, similar lateral sliding preventing effect can be achieved. Alternatively, in place of the indentations, members having great coefficient of friction such as rubber materials or foam materials can be adhered to the film light source unit and the film guide.

As explained in the first to third embodiment, according to the present invention, in the image reading apparatus for reading the transparent original of type in which the face light source unit urges the transparent original against the original glass plate to install the transparent original, by correcting the curl of the transparent original so that the transparent original is installed in close contact with the original glass plate as the focus design center position, the image can be read properly.

Further, during or after the installation of the light source unit, by eliminating the lateral sliding of the light source unit on the transparent original, the transparent original can be prevented from being damaged and the illuminating position can be prevented from being shifted, and, further, the operator can easily align the light source unit with the desired image. Further, during and after the installation of the light source unit, the transparent original can be prevented effectively from being damaged by the light source unit.

Fourth Embodiment

Next, a fourth embodiment of the present invention will be explained.

Figure 13:
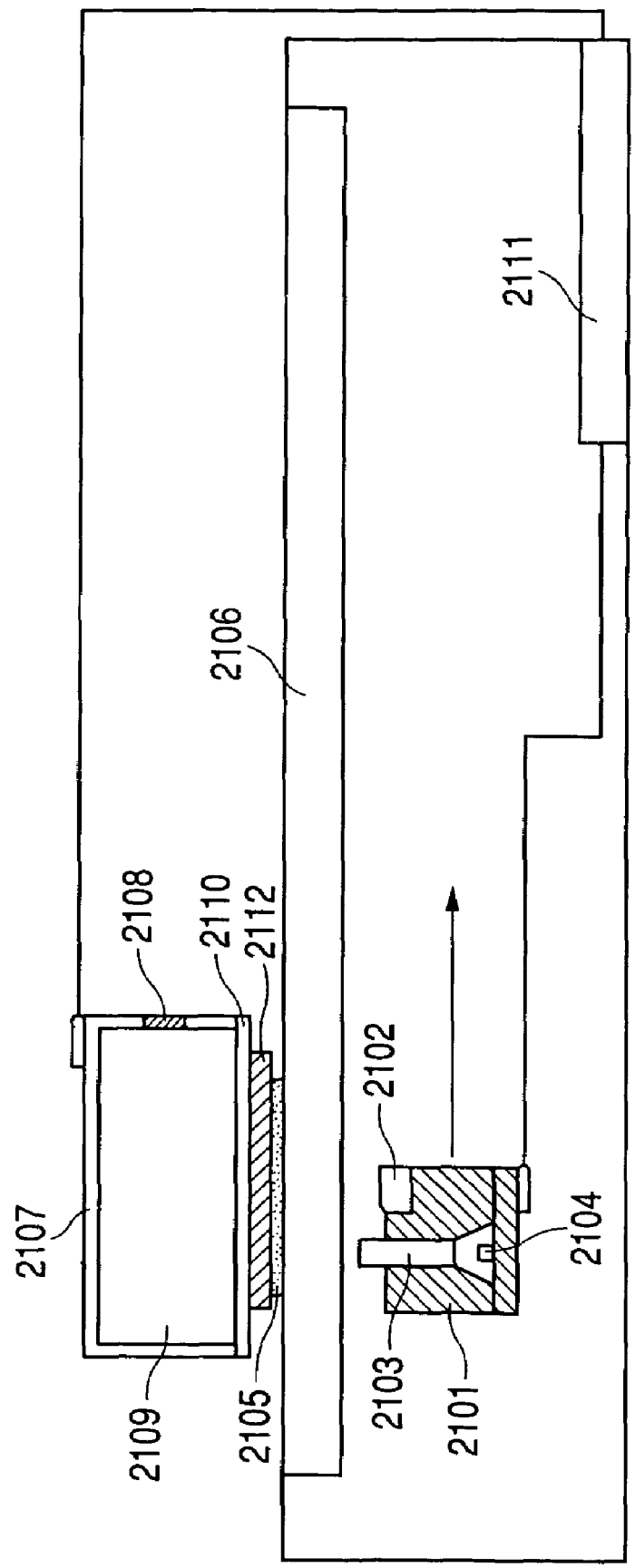
FIG. 13 is a schematic view of an image reading apparatus according to a fourth embodiment of the present invention.
Figure 14:
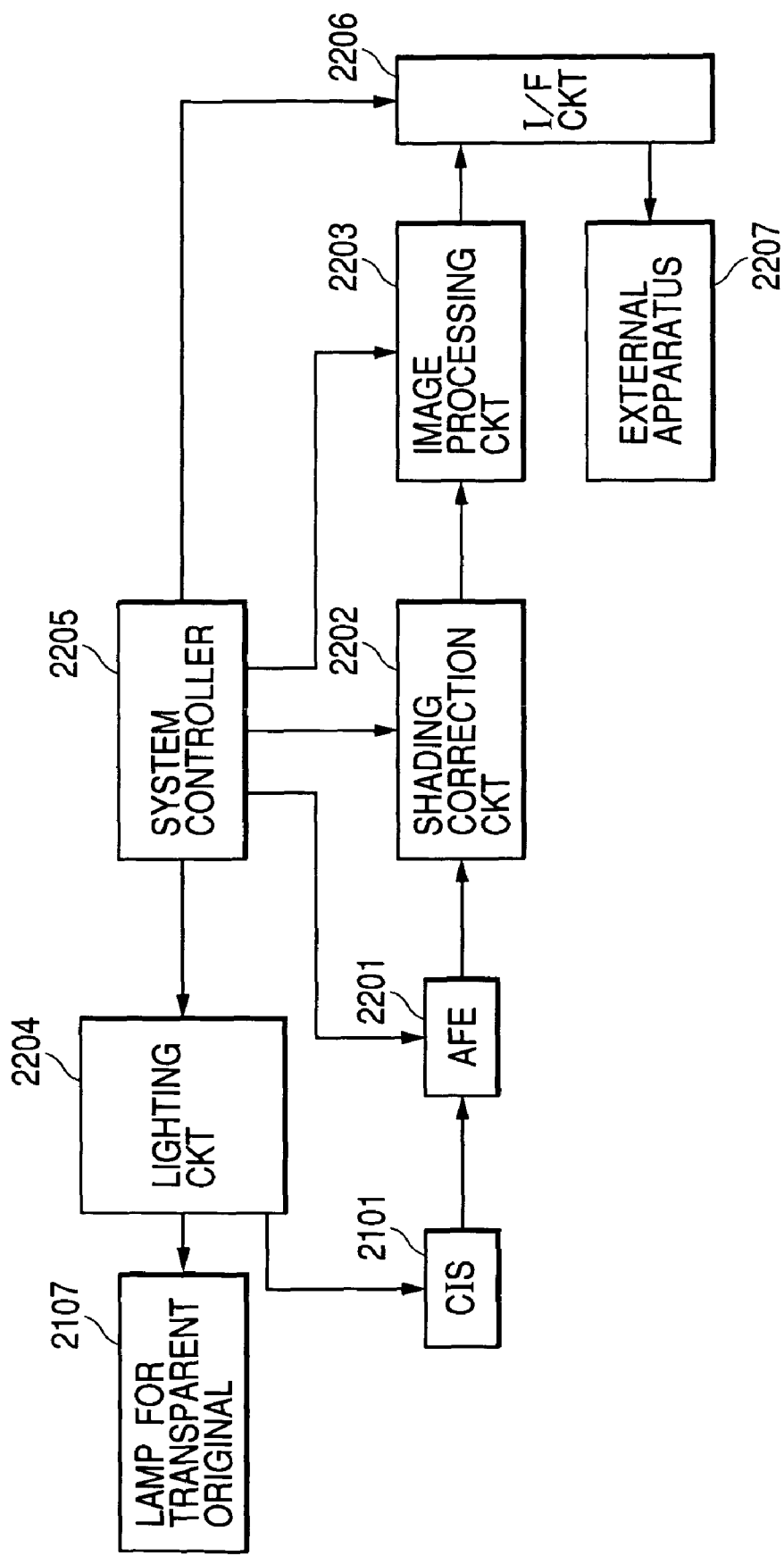
FIG. 14 is a block diagram of the image reading apparatus according to the fourth embodiment of the present invention.
Figure 15:
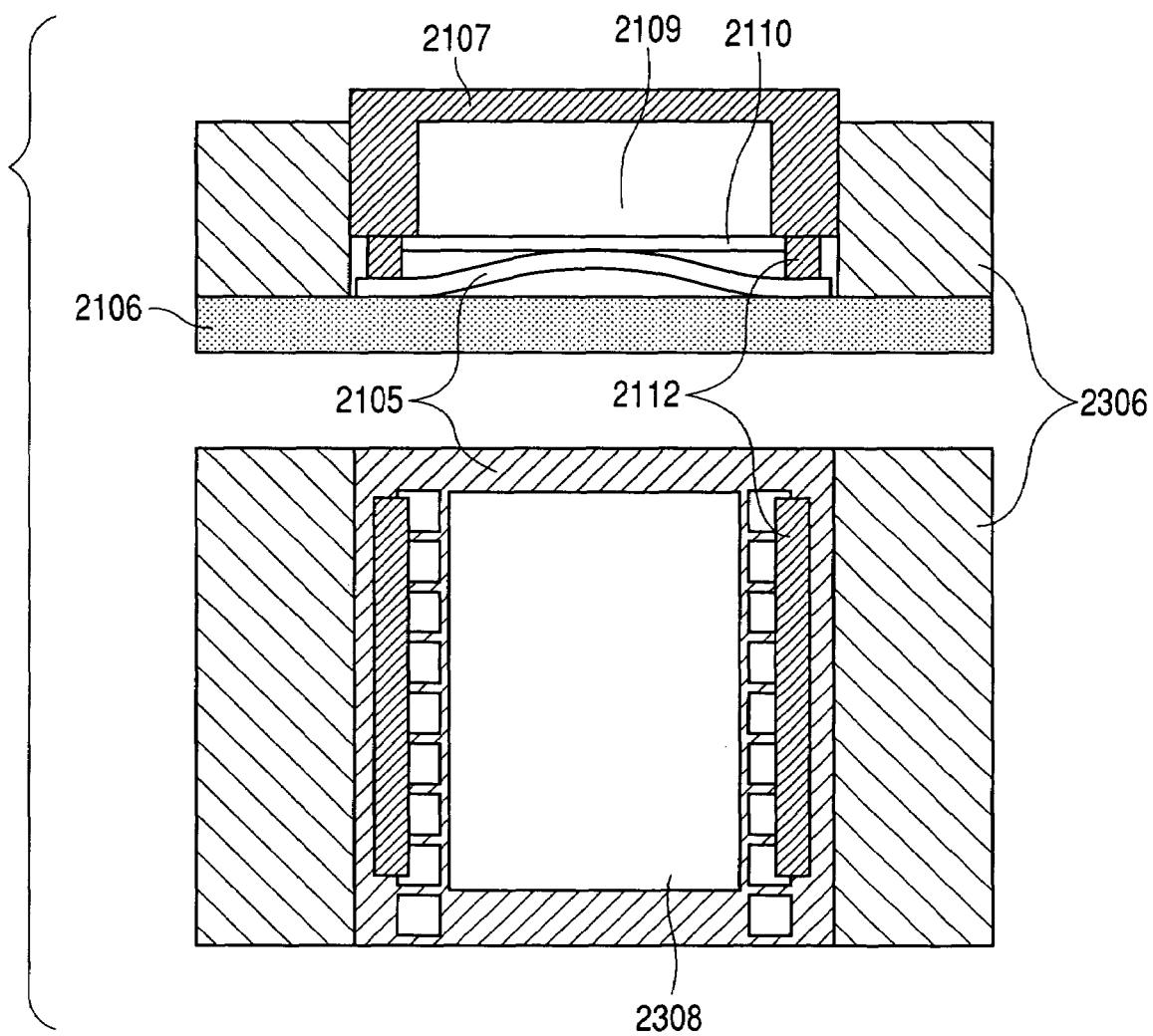
FIG. 15 is a view showing installation of an original to be read in the image reading apparatus according to the fourth embodiment of the present invention.

FIG. 13 is a schematic view showing an inner construction of an image reading apparatus according to a fourth embodiment of the present invention, FIG. 14 is a block diagram showing the inner construction of the image reading apparatus and FIG. 15 is a view showing installation of a transparent original to be read in the image reading apparatus according to the fourth embodiment of the present invention. Now, the construction of the apparatus will be described.

In FIGS. 13 and 14, a contact image sensor 2101 includes LEDs (not shown) for reading a reflection type original, a line-shaped light conductive member 2102, a rod lens array 2103 and a monochromatic image sensor 2104. In the rod lens array 2103, a distance between an object to be read and an imaging plane is 15 mm and the depth of field is ±0.3 mm. The rod lens array is installed so that an original to be read and situated at a distance of 0.1 mm above an original glass plate 2106 is focused.

In a case where the reflection type original is read, first of all, illumination lights from the R (red), G (green) and B (blue) color LEDs for the reflection type original driven by a lighting circuit 2204 are illuminated onto the original 2105 to be read in a line pattern via the line-shaped light conductive member 2102. Lights reflected from the original 2105 are received by the monochromatic image sensor 2104 through the original glass plate 2106 and the rod lens array 2103, where the lights are converted photo-electrically. In the above-mentioned operation, by switching the R, G and B color LEDs to successively light them for each line while shifting the contact sensor 2101 along the original in a sub scanning direction (shown by the arrow), the R, G and B line-sequentional two-dimensional color image on the reflection type original can be read.

In a case where the transparent original is read, by using a lamp 2107 for transparent original, illumination lights from the R (red), G (green) and B (blue) color LEDs 2108 for the transparent original are illuminated onto the entire original 2105 to be read through a face-shaped light conductive member 2109 and a diffusing sheet 2110. The light passed through the original 2105 are received by the monochromatic image sensor 2104 through the original glass plate 2106 and the rod lens array 2103, where the lights are converted photo-electrically. In the above-mentioned operation, by switching the R, G and B color LEDs 2108 to successively light them for each line while shifting the contact sensor 2101 along the original in a sub scanning direction (shown by the arrow in FIG. 13), the R, G and B line-sequentional two-dimensional color image on the transparent original can be read.

In both of the reading of the reflection type original and the reading of the transparent original, electrical signals photo-electrically converted by the monochromatic image sensor 2104 are sent to an electric substrate 2111 of the reading apparatus electrically connected to the monochromatic image sensor. The electric substrate 2111 is provided with an AFE 2201, a shading correction circuit 2202, an image processing circuit 2203, a lighting circuit 2204, a system controller 2205 and an interface circuit 2206 shown in FIG. 14, and the following processing operation is performed regarding the electrical signals sent from the contact image sensor 2101.

The AFE 2201 is an analogue front-end pre-processor serving to perform amplification, DC offset correction and A/D conversion of the electrical signal outputted from the image sensor 2104 to eventually output digital image data having 16 bits.

In a case where the transparent original is read, the shading correction circuit 2202 serves to store reference level data as shading correction data, which reference level date is obtained by reading the illumination light from a transparent original illuminating apparatus 2107 by means of the contact image sensor 2101 and to perform shading correction of image data produced by reading the original on the basis of the correction data. Incidentally, the shading correction data is stored in an external apparatus 2207 after the data acquisition, and data required for the scanning is downloaded to the image reading apparatus according to the illustrated embodiment. In the case where the reflection type original is read, the shading correction data is produced from a signal obtained by reading the reflection light from a standard white board.

The image processing circuit 2203 serves to perform predetermined processing of the image data such as gamma converting processing and packing processing in accordance with an image reading mode (binary values, 24-bit multi values and the like) previously set from the external apparatus 2207.

The interface circuit 2206 serves to receive a control signal and output an image signal, with respect to the external apparatus 2207 acting as a host apparatus such as a personal computer associated with the image reading apparatus according to the illustrated embodiment.

The system controller 2205 serves to control the image reading apparatus.

The external apparatus 2207 is a host computer in which software of a scanner driver for controlling the image reading apparatus is installed.

The scanner driver has a user interface by which the user can designate the image reading mode, a resolving power and a reading range, and serves to send a control signal based on the designation to the image reading apparatus through the interface circuit 2206 and sent reading start command. Further, the scanner driver serves to process the image data read by the image reading apparatus on the basis of the control signal and display the data on a screen.

Figure 17:
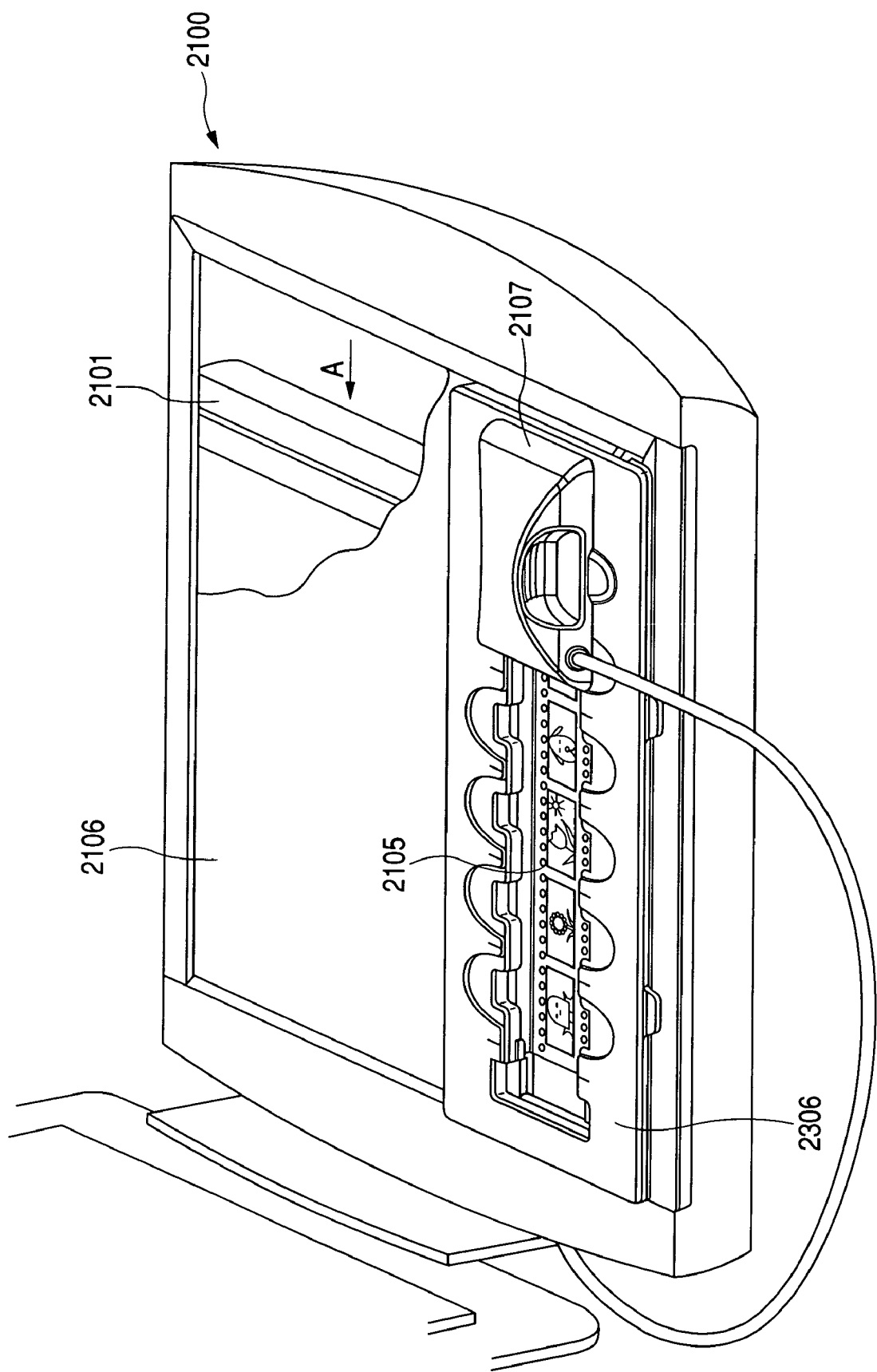
FIG. 17 is a view showing a condition that the a transparent original illuminating apparatus according to the present invention is installed in the image reading apparatus together with the film guide.

FIG. 17 shows a condition that the transparent original illuminating apparatus 2107 mounted to the image reading apparatus 2100. A frame-shaped film guide 2306 is mounted on the original glass plate 2106 of the image reading apparatus 2100 and the original 2105 to be read is mounted in a hole of a film mounting portion of the film guide 2306. Then, the transparent original illuminating apparatus 2107 is installed on the original 2105 in alignment with the film guide 2306. Here, the transparent original illuminating apparatus is installed on the right end frame of the film 2105 having six continuous frames.

Now, the details of the transparent original illuminating apparatus 2107 will be explained with reference to FIG. 15 showing a sectional view in a main scanning direction. The transparent original illuminating apparatus 2107 includes the LED 2108 for reading the transparent original, the face-shaped light conductive member 2109, the diffusing sheet 2110 and urging portions 2112 according to the present invention. In a case that the transparent original is read, first of all, the original 2105 to be read is rested on the original glass plate 2106 along the film guide 2306. The film guide 2306 has a frame having a hole slightly greater than the original 2105 to be read and serves to position the position of the original 2105 to be read in a flat face direction of the original glass plate. Then, the transparent original illuminating apparatus 2107 is set on the transparent original 2105. The transparent original illuminating apparatus 2107 has a width substantially the same as a width of the transparent original 2105 so that, when the illuminating apparatus is installed on the original 2105 to be read within the film guide 2306, a width-wise direction of the illuminating apparatus is determined by the hole of the film guide 2306. In this condition, since only the urging portions 2112 urge (or press) the original 2105 against the original glass plate 2106 and the urging portions 2112 is positioned out of the image area, any stress does not act on an image area 2308 of the transparent original. By selecting a height of the urging portions 2111 to 0.2 mm so that, even in a case where the imaged surface of the transparent original 2105 having a thickness of 0.15 mm faces upwardly or downwardly, the imaged surface is located within the field depth of the contact image sensor 2101 (0.1 mm±0.3 mm above the original glass plate 2106), if the image area 2308 of the transparent original is floating from the original glass plate 2106, the image of the original can be focused on the monochromatic image sensor 2104 without out of focus.

Fifth Embodiment

Next, a fifth embodiment of the present invention will be explained.

Figure 16:
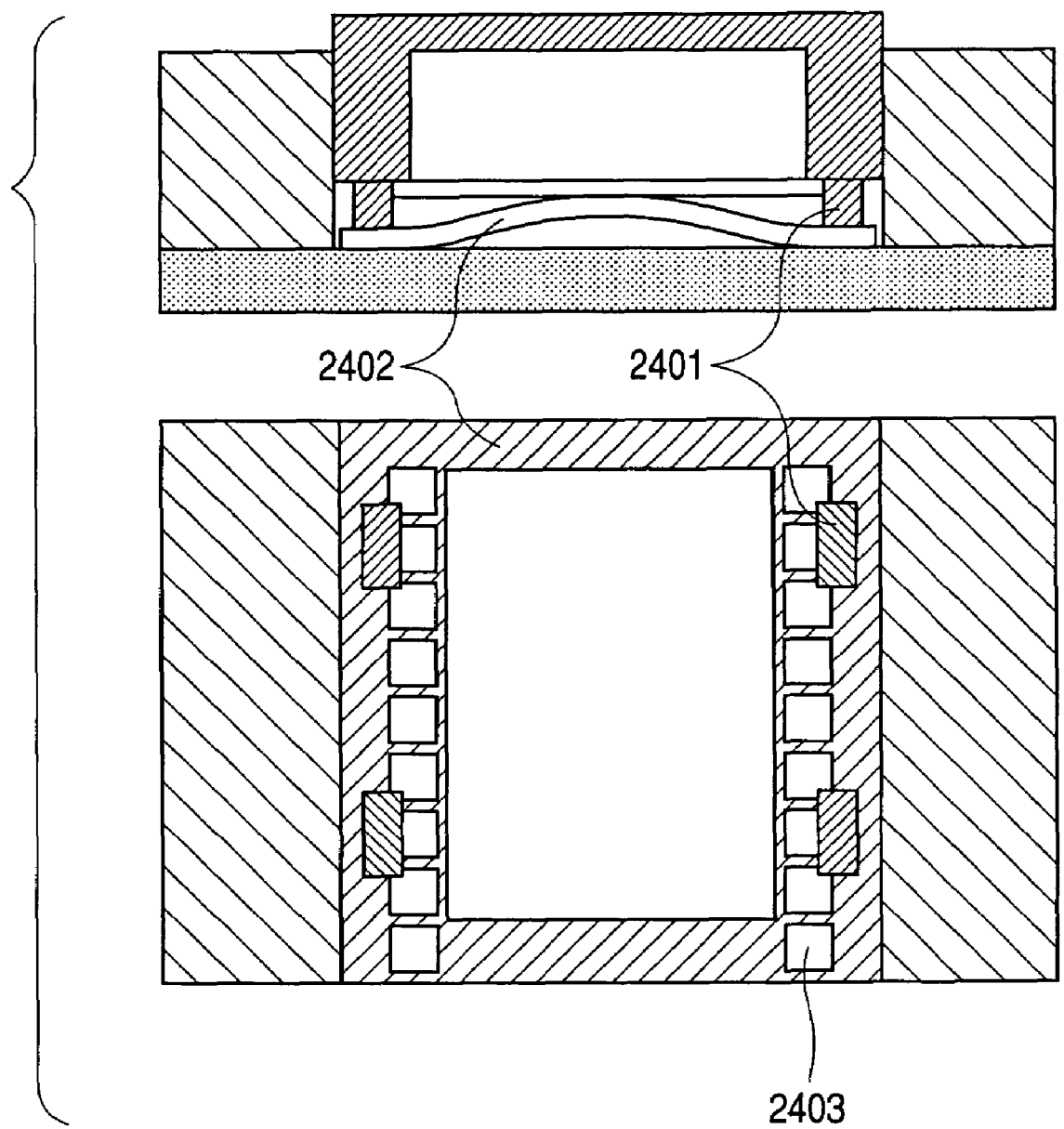
FIG. 16 is a view showing installation of an original to be read in an image reading apparatus according to a fifth embodiment of the present invention.

FIG. 16 is a sectional view showing installation of a transparent original to be read in an image reading apparatus according to a fifth embodiment of the present invention. In the fourth embodiment, each urging portion 2112 is constituted as a line-shaped member for urging the original 2105 to be read. In the fifth embodiment, as shown in FIG. 16, urging portions 2401 are constituted by a plurality of projections each having a length greater than a perforation 2403, so that the equivalent effect can be achieved even when the original 2402 to be read in urged.

Figure 18:
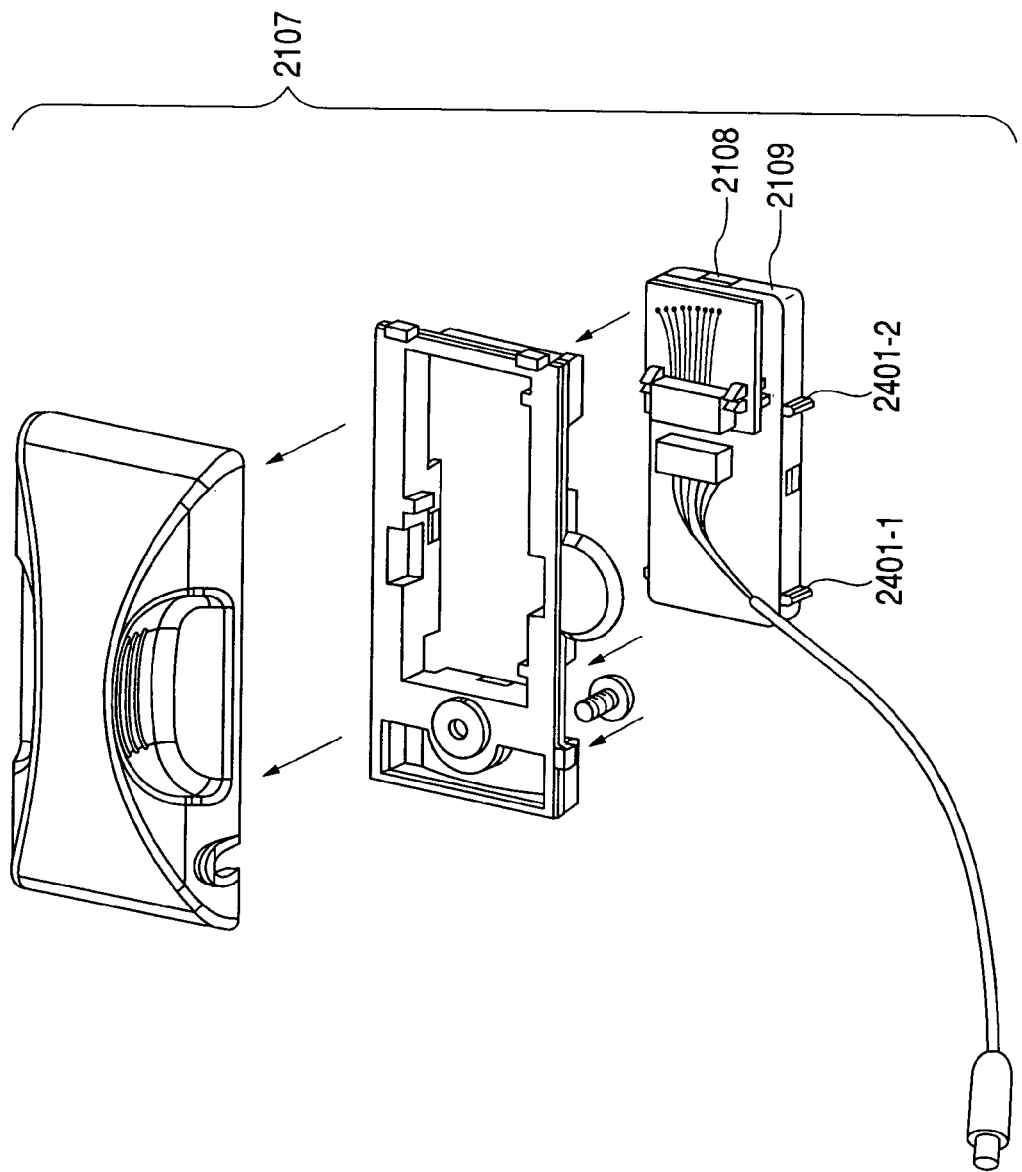
FIG. 18 is a constructional view of a transparent original illuminating apparatus according to the fifth embodiment of the present invention.
Figure 19:
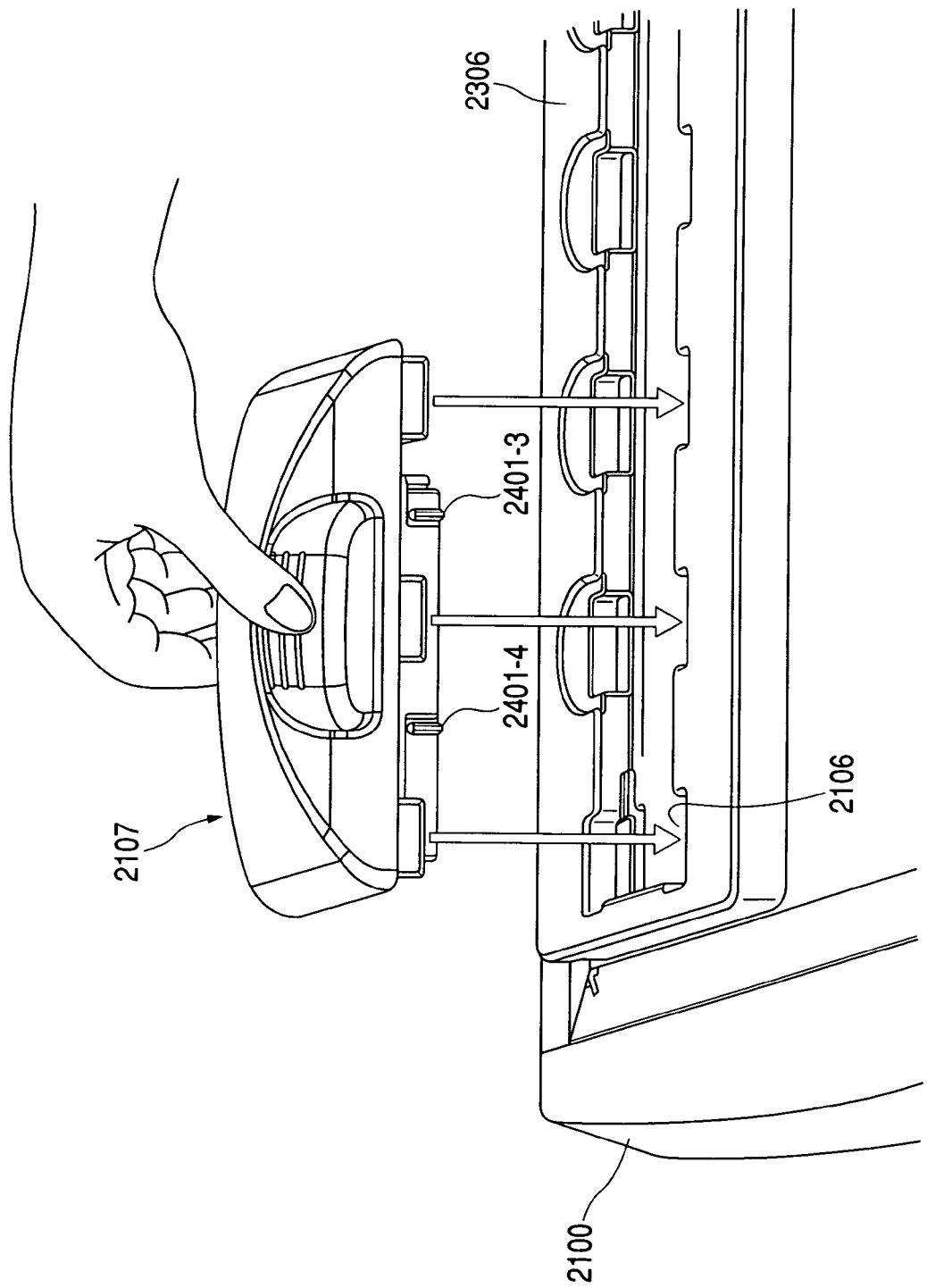
FIG. 19 is a view showing a method for mounting the transparent original illuminating apparatus according to the fifth embodiment of the present invention on an original glass plate of the image reading apparatus together with the film guide.

FIGS. 18 and 19 show a construction of a transparent original illuminating apparatus 2107 according to the fifth embodiment. Urging portions 2401-1, 2401-2, 2401-3 and 2401-4 are attached to a side of a face-shaped light conductive member 2109 and a lower surface of each urging portion is protruded downwardly from the light emitting surface. When a film as an original 2105 to be read is installed within the frame of the film guide 2306 and the transparent original illuminating apparatus 2107 is installed on the film, the urging portions 2401-1, 2401-2, 2401-3 and 2401-4 can urge the original 2105 to be read against the original glass plate 2106.

Sixth Embodiment

Next, a sixth embodiment of the present invention will be explained.

Figure 20:
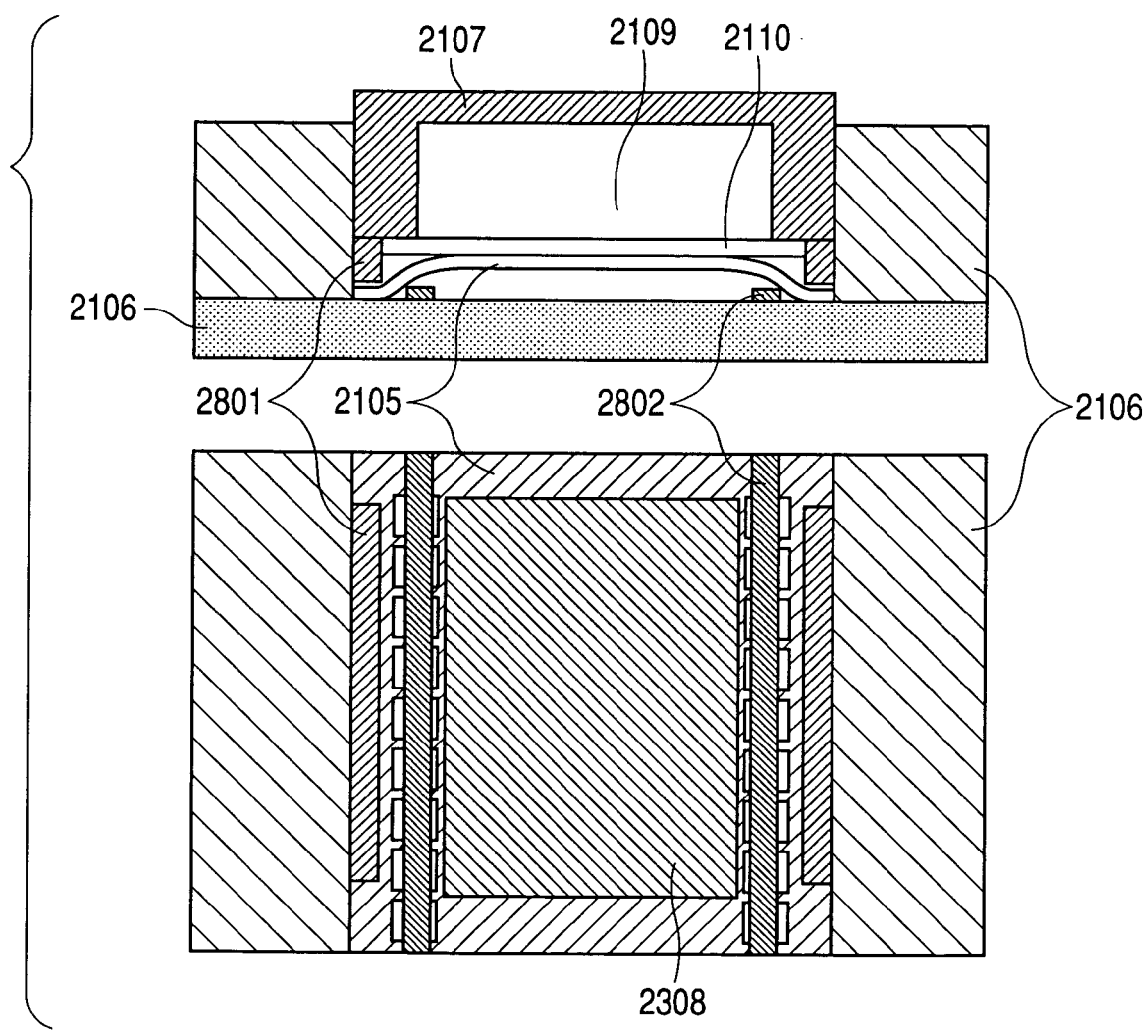
FIG. 20 is a view showing installation of an original to be read in an image reading apparatus according to a sixth embodiment of the present invention.
Figure 21:
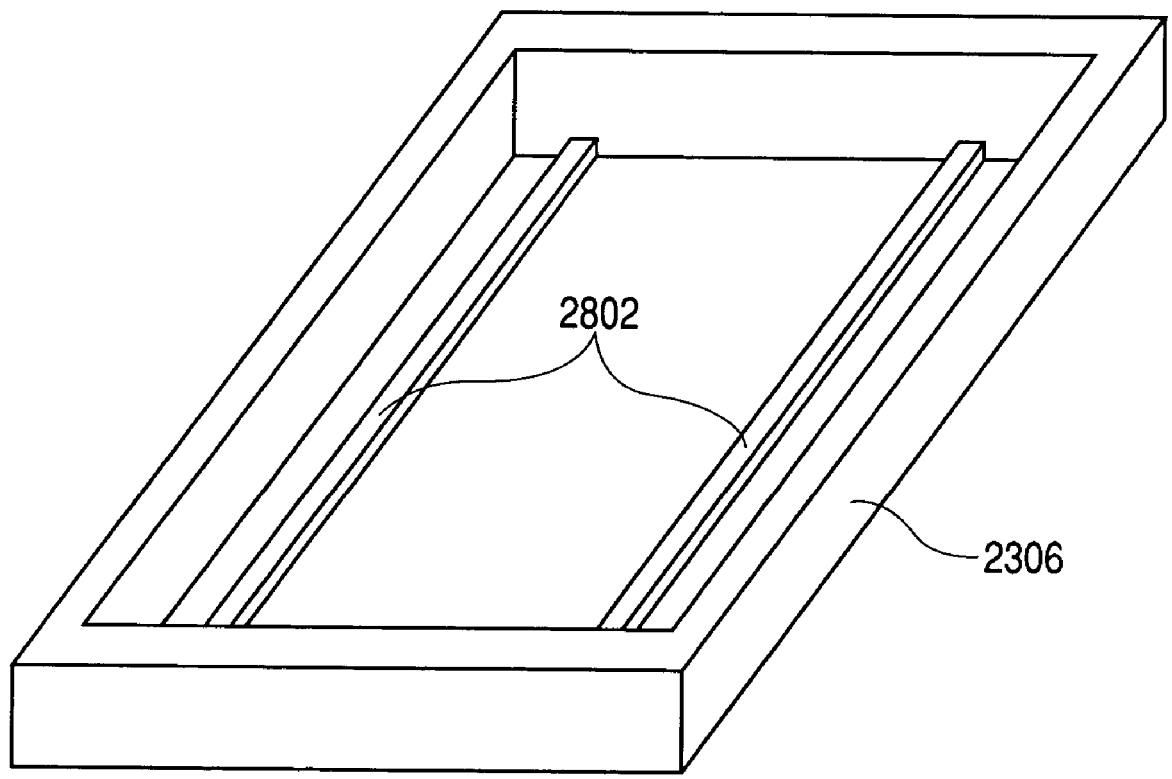
FIG. 21 is a constructional view of a film guide according to the sixth embodiment of the present invention.

FIG. 20 is a sectional view showing installation of an original to be read in an image reading apparatus according to a sixth embodiment of the present invention. In FIGS. 20 and 21, the same elements as those in FIG. 15 are designated by the same reference numerals. In comparison with FIG. 15, urging portions 2801 are arranged to urge lateral edges of the original 2105 to be read. Further, in this embodiment, as shown in FIG. 20, in addition to the fourth embodiment, the film guide 2306 is provided with spacer members 2802. In a case where the transparent original is read, first of all, the original 2105 to be read is rested on the spacer members 2802 of the film guide 2306 installed on the original glass plate 2106. Then, the transparent original illuminating apparatus 2107 is set on the transparent original 2105. In this condition, only the urging portions 2801 urge the original 2105 to be read against the original glass plate 2106, and an image area 2309 of the transparent original is lifted above the original glass plate due to the presence of the spacer members 2802. Further, by setting a height of the spacer member 2801 according to the present invention to 0.15 mm substantially the same as the height of the original 2105 to be located within the field depth of the contact image sensor 2101, the floating amount of the image area 2309 of the transparent original from the original glass plate 2106, 2306 can be suppressed within the field depth of the lens array 2103, so that the image can be imaged on the monochromatic image sensor 2104 without out of focus. Further, the close contact between the original glass plate 2106 and the image area of the original 2105 to be read can be prevented, thereby preventing occurrence of interference fringe.

As described in the fourth to sixth embodiments, according to the present invention, by urging the original within the field depth of the lens by using the above-mentioned urging members, the transparent original can be installed at the focusing position of the lens also in the compact image reading apparatus using the lens having shallow filed depth. Thus, not only the reflection type original but also the transparent original can be read. Further, regardless of the arrangement in which the transparent original is installed within the small range, excessive stress does not acts on the transparent original thereby to prevent the damage of the original and, furthermore, the close contact between the image area of the original and the original glass plate, which would cause the interference fringe, can be prevented.

What is claimed is:

1. An image reading apparatus for reading a transparent original having perforation holes, in which the apparatus has a transparent original illuminating device, the transparent original, a transparent original plate for receiving the transparent original there-against, an imaging lens, and a reading sensor arranged in order, said imaging lens being equipped with a rod lens array which is to be focused on the transparent original disposed against said transparent original plate, wherein said transparent original illuminating device is provided at its transparent original side with a plurality of protruding urging portions disposed at positions corresponding to an out-of image area in a width direction of the transparent original, said urging portions protruding above a light emitting surface less than a depth of field of said lens, and wherein the transparent original is urged against said transparent original plate by said protruding urging portions, surfaces of the urging portions abutting against the transparent original are larger than the perforation holes of the transparent original, and the protruding urging portions urge at least parts of surrounding areas of successive perforation holes of the transparent original, respectively.

2. An image reading apparatus according to claim 1, wherein said plurality of urging portions are provided on an out, in a width direction of the transparent original, of a light emitting area of said transparent original illuminating device.

3. An image reading apparatus according to claim 1, further comprising a transparent original guide rested on said transparent original plate and adapted to determine positions of the transparent original and said transparent original illuminating device.

4. An image reading apparatus according to claim 3, wherein said transparent original guide is provided with a spacer member located at a position out of an image area of the transparent original and inside of said urging portions between the transparent original and said transparent original plate.

5. An image reading apparatus according to claim 3, wherein a contract surface between said illuminating device and said guide is provided with sliding preventing means.

6. An image reading apparatus according to claim 3, further comprising positioning means for determining a relative position between the transparent original, said guide, and said light source unit, and wherein, by the positioning of said positioning means, said light source unit can illuminate the entirety of at least any one image surface of among plural images included in the transparent original.

7. An image reading apparatus according to claim 6, wherein said positioning means include a convex/concave portion provided between said guide unit and said light source unit.

* * * * *